US010459897B2

(12) United States Patent
Vance

(10) Patent No.: US 10,459,897 B2
(45) Date of Patent: *Oct. 29, 2019

(54) METHOD FOR PETROLEUM RECOVERY AND CARBON DIOXIDE SEQUESTRATION

(71) Applicant: ARCADIS Corporate Services, Inc., Highlands Ranch, CO (US)

(72) Inventor: David B. Vance, Midland, TX (US)

(73) Assignee: ARCADIS Corporate Services, Inc., Highlands Ranch, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/148,908

(22) Filed: Oct. 1, 2018

(65) Prior Publication Data

US 2019/0128101 A1  May 2, 2019

Related U.S. Application Data

(62) Division of application No. 14/695,442, filed on Apr. 24, 2015, now Pat. No. 10,087,720.
(Continued)

(51) Int. Cl.

| | |
|---|---|
| *E21B 43/16* | (2006.01) |
| *G06F 16/21* | (2019.01) |
| *G06Q 10/06* | (2012.01) |
| *E21B 41/00* | (2006.01) |
| *G06F 16/29* | (2019.01) |
| *G06Q 50/02* | (2012.01) |
| *E21B 49/00* | (2006.01) |

(52) U.S. Cl.
CPC ........ *G06F 16/212* (2019.01); *E21B 41/0064* (2013.01); *E21B 43/164* (2013.01); *E21B 49/00* (2013.01); *G06F 16/29* (2019.01); *G06Q 10/063* (2013.01); *G06Q 10/0635* (2013.01); *G06Q 50/02* (2013.01); *Y02C 10/14* (2013.01); *Y02P 90/84* (2015.11)

(58) Field of Classification Search
CPC ............. E21B 41/0092; E21B 41/0064; E21B 43/164; G06F 17/30241; G06F 17/320294; G06Q 10/635

See application file for complete search history.

(56) References Cited

U.S. PATENT DOCUMENTS

| | | | |
|---|---|---|---|
| 6,543,535 B2 * | 4/2003 | Converse | C09K 8/58 166/246 |
| 10,087,720 B1 * | 10/2018 | Vance | G06F 16/29 |
| 2011/0308790 A1 * | 12/2011 | Strapoc | C09K 8/582 166/250.01 |

* cited by examiner

*Primary Examiner* — Silvana C Runyan
(74) *Attorney, Agent, or Firm* — Nancy J. Flint, Attorney At Law, P.A.; Nancy J. Flint, Esq.

(57) ABSTRACT

A method for the economic assessment of residual oil zones ("ROZ"), support for the engineering of the design of $CO_2$ enhanced oil recovery ("EOR") systems associated with production of petroleum from ROZ, support of EOR operations, and subsequent management and monitoring of $CO_2$ sequestered in ROZ is disclosed. This efficient identification and assessment of ROZs significantly increases the geographic footprint and target locations into which $CO_2$ can be injected and ultimately utilized and permanently sequestered in a commercial fashion generating value to partially offset the parasitic costs associated with the capture of anthropogenic $CO_2$. Microbial self limitation (MSL) conditions of an ROZ are exploited for the assessment and management purposes of the ROZ.

5 Claims, 3 Drawing Sheets

Related U.S. Application Data

(60) Provisional application No. 61/983,838, filed on Apr. 24, 2014.

METHOD FOR PETROLEUM RECOVERY AND CARBON DIOXIDE SEQUESTRATION

FIELD OF THE INVENTION

The invention relates to a method for the economic assessment of Residual Oil Zones ("ROZ"), support for the engineering of the design of carbon dioxide ("$CO_2$") enhanced oil recovery ("EOR") systems associated with production of petroleum from ROZ, support of EOR operations, and subsequent management and monitoring of $CO_2$ sequestered in ROZ. Efficient identification and assessment of ROZs significantly increases the geographic footprint and target locations into which $CO_2$ can be injected and ultimately utilized and permanently sequestered in commercial operations generating value to partially offset the parasitic costs associated with the capture of anthropogenic $CO_2$. This invention is directly correlated to a newly discovered character of ROZs, Microbial Self Limitation (MSL) conditions. A MSL-ROZ has native characteristics that can be exploited for the assessment and management purposes outlined above.

BACKGROUND OF THE INVENTION

Oil exists in the small pores and in the narrow fissures and interstices within the body of the reservoir rocks underneath the surface of the earth. A Residual Oil Zone (ROZ) is a petroleum deposit located beneath an existing primary petroleum production zone or associated with a geologic unit from which petroleum has migrated, migrated through or been flushed. ROZs typically cannot be economically developed using convention petroleum production engineering or secondary enhanced oil recovery (EOR) techniques such as water flooding.

Crude oil production in U.S. oil reservoirs takes place in three distinct phases: primary, then enhanced secondary, and finally tertiary recovery. Natural processes within geologic units that host reservoirs cause the oil to flow into traps that provide primary production, which depends upon multiphase hydrodynamics and the characteristics of the reservoir rock and the properties of the entrained gas, water, and hydrocarbon fluids. In many reservoirs, which are the part of a much large aquifer system, a natural flow of underground waters may be the drive force (aquifer drive) to push and displace oil into traps. ROZs are associated with the zones through which aquifer drives takes place.

As oil saturations decline in zones through which aquifer drive takes place, the mobility of the residual oil decreases as more of it is trapped by capillary forces by "snap-off" or in dead-end pores. Significant oil remains in the pores, but it can no longer be made to migrate toward proximal production wells nor towards primary traps. If the oil in the ROZ is unreactive at this point it is necessary to provide external energy to achieve oil recovery from the ROZ. Secondary recovery in primary production zones can be achieved by injecting gas (gas injection) and/or water (water flooding) to re-pressurize the reservoir and reestablish a drive mechanism to displace oil and drive it to the wellbore. Water flooding is a dominant means of secondary recovery and is implemented by injecting water into a set of wells while producing from the surrounding wells. When it becomes uneconomic to continue water flood operations tertiary recovery can begin by injecting $CO_2$. Commonly if a water flood worked well in a reservoir tertiary recovery will also perform well, and data and information gathered during primary and secondary recovery can be used for design and operation of the $CO_2$ EOR program.

A differentiating element of ROZs compared to the primary, secondary, and tertiary recovery from primary production zones is that development proceeds by directly using $CO_2$ injection. All of the historical data and operational elements available from primary zone production are not available for ROZ production.

The use of $CO_2$ injection for the recovery of petroleum from ROZs involves injection of compressed $CO_2$ into the reservoir where it makes contact with oil, increasing oil mobility and increasing the amount of oil that is moved to production wells.

$CO_2$ EOR involves reducing the interfacial tension between the oil and geologic matrix, changing the oil's viscosity, swelling the oil, and effectively releasing most of it from the geologic matrix pores. Some of the injected $CO_2$ is exchanged for the displaced oil and water in the pores, and remains lodged in the formation via several mechanisms, including capillary, phase, solution, structural and stratigraphic trapping. These processes ultimately contribute to the permanent sequestration of the $CO_2$.

Today, with much of the easy-to-produce oil recovered from U.S. oil fields using primary and secondary techniques, producers are now using a variety of tertiary, or enhanced oil recovery (EOR), techniques with the goal of producing 30 to 60 percent, or more, of the reservoir's original oil. United States reserves of oil associated with primary production zones is estimated to be 100 billion barrels. Estimates of oil reserves that are distinct to ROZs are early and likely to increase, but currently are in the range of 30 billion barrels in the Permian Basin alone.

A key element for the exploration, assessment and actual operation of a $CO_2$ EOR program in an ROZ is the residual petroleum concentration and the chemical/physical state of that petroleum. Petroleum concentrations can be too low for exploitation (currently that lower concentration number is 12% of the available pore space). Current industrial practitioners of ROZ development estimate that the ultimate future magnitude of the petroleum resource in ROZs may be in the range of 50% to 100% of all known primary petroleum production.

The composition of oil and its effects on the physical chemistry of hydrogen sulfide ($H_2S$) partitioning between the oil and water affect the residual oil saturation in an ROZ. $H_2S$ is a toxic, corrosive gas found in many oilfield production systems. While $H_2S$ can be indigenous to oil fields, it also can be generated within a reservoir by sulfate-reducing microbes as a result of injecting sulfate-containing water during water flood and also by consumption of sulfate from anhydrite or gypsum in the mineral matrix, causing reservoir souring. Residual oil saturation in an ROZ is significantly determined by the microbial activity of sulfate reducing microbes identified by Domain (Bacteria+Archaea+ekaryote fungi) and species which obtain energy by oxidizing organic compounds or molecular hydrogen ($H_2$) while reducing sulfate ($SO_4^{-2}$) to hydrogen sulfide ($H_2S$). It is important to evaluate specific metabolic pathways and the distinction of heterotrophic and autotrophic microbes which will affect the carbon balance and stoichiometry in the ROZ.

Microbes consume sulfate and hydrocarbons in the process, and the degree of hydrocarbon consumption is limited due to $H_2S$ inhibition, typically beginning at concentrations ranging from about 50 to about 400 mg/l. Without MSL conditions, over geologic time frames all of the oil in an ROZ would biodegrade. The MSL condition not only preserves the residual oil in place, but provides useful exploration, assessment, and operational tools (as previously described) as well.

When $CO_2$ is used for enhanced oil recovery, a portion is retained in each usage cycle with ultimately some portion of it irretrievably retained (i.e., sequestered) through a combination of capillary, solution and physical trapping mechanisms.

SUMMARY OF THE INVENTION

The invention relates to a method for the exploration, assessment, development and operation of ROZs comprising prediction and determination of residual petroleum concentrations and the physical/chemical nature of that petroleum and surrounding mineral matrix in a potential ROZ comprising a multidisciplinary process configured to generate requisite and desired data from a wide range of ROZ conditions and settings. The invention further comprises the assessment, management and monitoring of the sequestration of $CO_2$ associated with $CO_2$ EOR operations in ROZs. The invention is associated with the discovery that oil is retained in ROZs over geologic time frames by MSL processes.

In one embodiment, the invention comprises the use of multimedia sampling and analyses to generate data defining MSL conditions and the various processes outlined above to quantitatively and qualitatively evaluate the condition in a residual oil zone (ROZ) to allow for decision making regarding the economics and proper operations that will be associated with development of that ROZ resource.

In one embodiment, MSL is utilized in the determination of how multiple in situ conditions govern the microbial processing of petroleum in a nascent and existing ROZ. Among those process are: selective degradation and modification of native hydrocarbons species in petroleum; the alteration of native hydrocarbons to generate charged or polar species such as organic acids, ketones, and alcohols that interact with mineral surface charges to stimulate adsorption of the hydrocarbons to mineral surfaces providing physical stabilization in the ROZ; the effect of biosurfactants on the multiphase systems; the capacity for stimulation of iron reducing; sulfate reducing; methanogenic and other labile elemental systems such as manganese etc.; and the processes and effects of microbial inhibition and the specific conditions of the MSL (such as those caused by hydrogen sulfide) on the ROZ system that prevent the complete degradation of entrained petroleum, allowing residual oil to remain in place.

In addition to physical/chemical assessment, the specific microbial consortia can be identified by Domain (Archaea and Bacteria) and species.

Associated with the microbial processes in ROZs are effects on mineral species that include specific mineral compositions (anhydrite, calcite, dolomite, and elemental sulfur are examples) and crystal habit. In particular biogenic mineral production leads to amorphous/nano-crystalline/chaotic forms that present enhanced reactivity towards $CO_2$, which leads to the permanent sequestration and storage of that $CO_2$.

DETAILED DESCRIPTION OF THE INVENTION

Figure 1:
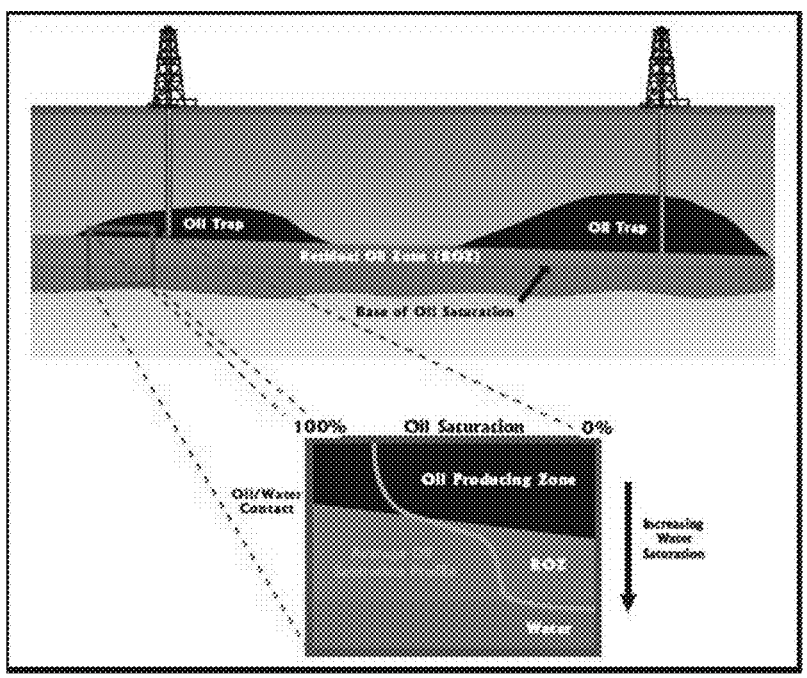
FIG. 1 depicts a schematic of a petroleum production zone.
Figure 2:
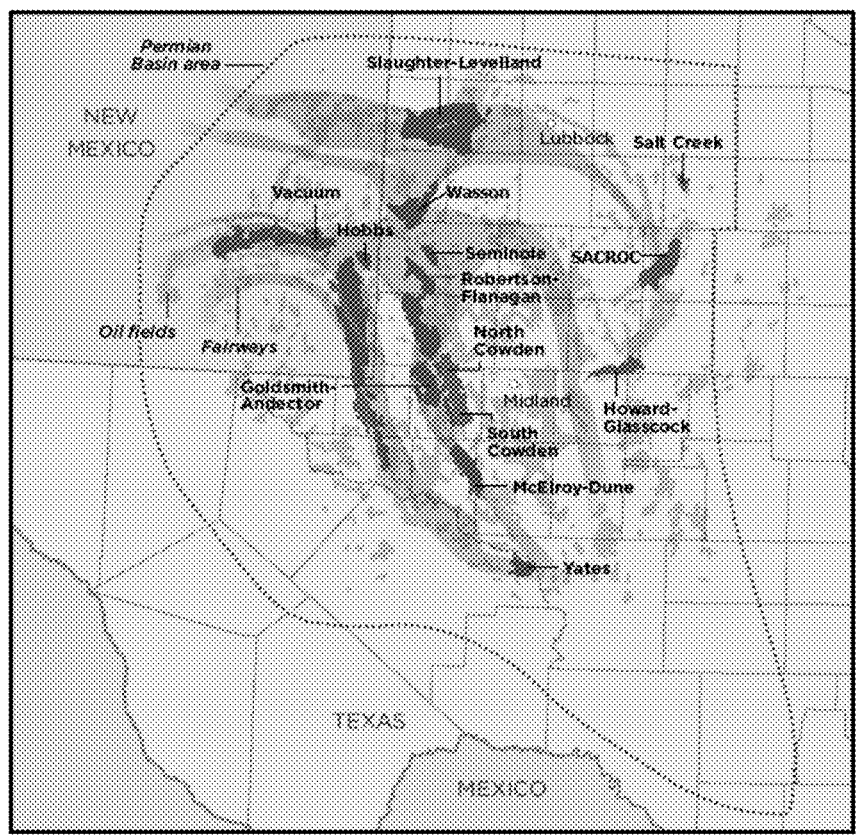
FIG. 2 depicts a schematic mapping of the Permian Oil Basin Region of the southwestern United States.
Figure 3:
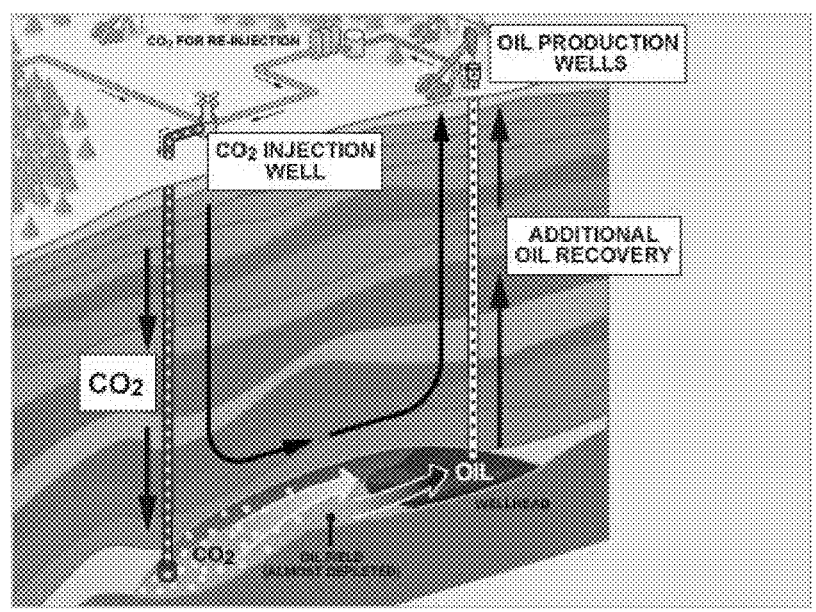
FIG. 3 depicts the use of $CO_2$ injection for the recovery of petroleum from residual oil zones.

The invention relates to a method for the exploration, assessment, development and operation of ROZs comprising prediction and determination of residual petroleum concentrations and the physical/chemical nature of that petroleum and surrounding mineral matrix in a potential ROZ comprising a multidisciplinary process configured to generate requisite and desired data from a wide range of ROZ conditions and settings. The invention further comprises the assessment, management and monitoring of the sequestration of $CO_2$ associated with $CO_2$ EOR operations in ROZs. The invention is associated with the discovery that oil is retained in ROZs over geologic time frames by MSL processes.

The invention is applicable to other forms of tertiary EOR such as surfactant or gas (including but not limited to nitrogen, methane or natural gas) flooding.

Natural processes that control residual petroleum concentrations and chemical/physical properties of that petroleum fall into the following technical disciplines: biogeochemistry; inorganic chemistry; organic chemistry; physical chemistry; interfacial chemistry; multimedia solubility relationships; geochemistry of the mineral matrix; digenetic processes and the physical conditions (such as porosity and permeability) that govern multiphase (gas, water, and petroleum) hydrogeological processes and flow regimes; local and regional geothermal gradients that govern formation temperatures (that differentiate between thermogenic and biogenic sulfate reduction); geophysical properties; and the response to and inhibition of the activity of indigenous (or introduced) microbial populations to the presence of petroleum hydrocarbons.

The invention comprises the use of multimedia sampling and analyses to generate data defining MSL conditions and the various processes outlined above to quantitatively and qualitatively evaluate the condition in a ROZ to allow for decision making regarding the economics and proper operations that will be associated with development of that ROZ resource. This includes selection of media (gas, water, petroleum, and mineral matrix) to be sampled, sampling protocols that will include: surface collection at atmospheric conditions; surface collection retaining pressure or temperature conditions; and in situ (within the ROZ interval) conditions. A suite of geophysical techniques may be used for the ROZ evaluation.

Predefined testing procedures that are used in connection with the method of the invention including quantitative and qualitative analysis of petroleum, formation fluids, and gas using multiple appropriate analytical techniques. In addition, physical/chemical characterizations can be determined based on known and available thermodynamic data for multi-phase systems, empirical data directly collected, and laboratory data collected using equipment to produce pressure and temperature conditions that replicate those in source formations, ROZ and main pay zones. The data can subsequently be used to model conditions to provide more accurate assessment, design, operation, and monitoring of the commercial aspects of the $CO_2$ EOR flood system. This ultimately contributes to utilization driven sequestration of the $CO_2$.

One of the steps in the method of the invention is the concept of MSL to guide the determination of how multiple in situ conditions govern the microbial processing of petroleum in a nascent and existing ROZ. Among those process are: selective degradation and modification of native hydrocarbons species in petroleum; the alteration of native hydrocarbons to generate charged or polar species such as organic acids, ketones, and alcohols that interact with mineral surface charges to stimulate adsorption of the hydrocarbons to mineral surfaces providing physical stabilization in the ROZ; the effect of biosurfactants on the multiphase systems; the capacity for stimulation of iron reducing; sulfate reducing; methanogenic and other labile elemental systems such as manganese etc.; and the processes and effects of microbial inhibition and the specific conditions of the MSL (such as those caused by hydrogen sulfide) on the ROZ system that prevent the complete degradation of entrained petroleum, allowing residual oil to remain in place. Understanding of heterotrophic versus autotrophic microbial activity contribute to quantifying hydrocarbon balance and stoichiometry. Heterotrophs use hydrocarbons to produce biomass, autotrophs use $CO_2$ to produce biomass and are more conservative with regards to percent residual oil retention. In sour oil systems (with hydrogen sulfide) the dominant control is inhibition from the hydrogen sulfide. In sweet oil systems (low sulfur) the dominant source of inhibition is due to hydrocarbon interactions with lipid bilayers in the cell walls of the microbes reacting with the hydrocarbons.

In addition to the physical/chemical assessment described above, the specific microbial consortia can be identified by Domain (Archaea and Bacteria) and species. The identification of the presence of specific microbial populations, associated biogeochemical processing pathways, and the critical inhibition dynamics is accomplished by multiple microbial identification methods including (but not limited to): various forms of genetic analysis, biochemical profiles of cells walls and other microbial constituents, and various incubation methods such as plate counts.

Associated with the microbial processes in ROZs are effects on mineral species that include specific mineral compositions (anhydrite, calcite, dolomite, and elemental sulfur are examples) and crystal habit. In particular biogenic mineral production leads to amorphous/nano-crystalline/chaotic forms that present enhanced reactivity towards $CO_2$, which leads to the permanent sequestration and storage of that $CO_2$.

Biochemically driven changes in the mineral matrix are significant since they can change the porosity and permeability of the matrix, and most importantly with regards to the potential for ultimate $CO_2$ sequestration in mineral phases, generate dolomite which has excess cations compared to limestone and produce nano to microcrystalline mineral phases that have higher intrinsic reactivity in the presence of $CO_2$. Dolomitization appears to be a consistent property of primary oil zones and ROZs. The microbiological activity that takes place in the oil/water phase of these systems generates mineral surface coating materials that contain charged carboxyl groups. This includes biomass, extracellular films, and altered hydrocarbons. These negatively charged carboxyl groups then preferentially adsorb magnesium that is subsequently incorporated into dolomite.

Microbial processing and understanding of MSL conditions in ROZs generates geologic targets for the economic application of $CO_2$ in EOR systems, and creates conditions that are more amenable to ultimate sequestration of $CO_2$ in those systems.

Definition of microbial processes enables the engineering and operation of associated $CO_2$ flood systems and supports the management and monitoring of subsequent sequestration processes.

Additionally, ROZs, their source areas and associated primary oil deposits occur on regional geographic scales with multiple formations over vertical intervals in the subsurface. Complex large data sets concerning the chemical and physical conditions described above are managed as part of the method of the invention including identification and utilization of existing data sets, assimilation of data generated by the described ROZ assessment process, and horizontal and vertical information providing the three dimensional configuration of ROZ conditions. The creation and management of Geographic Information Systems types of data bases efficiently integrate the information into the commercial and research needs of the petroleum production community.

The foregoing embodiments have been presented for the purpose of illustration and description only and are not to be construed as limiting the scope of the invention in any way.

What is claimed is:

1. A method of development of a ROZ resource comprising:
   quantitatively and qualitatively evaluating how in situ microbial self limitation (MSL) conditions in a residual oil zone (ROZ) govern microbial processing of petroleum in the ROZ and determining operations associated with development of the ROZ through a plurality of processes comprising:
   identifying and obtaining one or more samples of media from the ROZ wherein the media comprises gas, water, petroleum, mineral matrix and combinations thereof;
   identifying specific microbial consortia and associated metabolic pathways within the one or more samples of media that are identified and obtained from the ROZ, wherein identifying specific microbial consortia and associated metabolic pathways within the one or more samples of media that are identified and obtained from the ROZ comprises identification by domain and species and by heterotrophic and autotrophic metabolic pathways;
   determining effects of microbial processes of microbial consortia on mineral species within one or more of the samples of media that are identified and obtained from the ROZ;
   thereafter determining how the in situ MSL conditions govern microbial processing of petroleum by microbial consortia in the one or more samples of media that are identified and obtained from the ROZ to effect biogenic mineral production of amorphous, nano-crystalline and chaotic mineral forms having enhanced physical, chemical, or physical and chemical reactivity towards CO2, the determination made by a process comprising:
   determining activity of indigenous or introduced microbial consortia to presence of petroleum hydrocarbons based on selective degradation and modification of native hydrocarbons species in the one or more samples of media that are identified and obtained from the ROZ;
   determining whether the modification of the native hydrocarbon species generates charged or polar species that interact with mineral surface charges to stimulate adsorption of petroleum hydrocarbons to mineral surfaces within the one or more samples;
   determining effect of biosurfactants on the one or more samples obtained from the ROZ;

determining capacity for stimulation of iron reduction by the microbial consortia within the one or more samples;

determining effect of sulfate reduction, methanogenic and labile elemental systems, and processes and effects of microbial inhibition that prevent substantially complete degradation of petroleum in the one or more samples; and combinations thereof;

determining ability of the amorphous, nano-crystalline and chaotic mineral forms having enhanced physical, chemical, or physical and chemical reactivity towards $CO_2$ that were effected by processing of petroleum by the microbial consortia in the one or more samples taken from the ROZ to sequester and store at least some injected $CO_2$; and, thereafter determining the effects of the microbial consortia on mineral species and the determination of how in situ MSL conditions govern the microbial processing of petroleum by the microbial consortia to effect biogenic mineral production of amorphous, nano-crystalline and chaotic mineral forms having enhanced physical, chemical, or physical and chemical reactivity towards $CO_2$ within one or more of the samples obtained from the ROZ.

2. The method of claim 1, further comprising generating data comprising laboratory data collected using equipment to produce pressure and temperature and physical conditions and chemical conditions that replicate those in the ROZ, source formation of the ROZ and main pay zones associated with the ROZ.

3. The method of claim 2, wherein the physical conditions comprise porosity and permeability.

4. The method of claim 1, further comprising determining local and regional geothermal gradients that govern formation temperatures differentiate between thermogenic and biogenic sulfate reduction.

5. The method of claim 1, wherein the microbial consortia comprise indigenous, introduced or a combination of indigenous and introduced populations.

* * * * *